United States Patent
D'Errico

(10) Patent No.: US 9,509,411 B2
(45) Date of Patent: Nov. 29, 2016

(54) PHASE SHIFT KEYING OPTICAL MODULATION APPARATUS AND METHOD OF ENCODING A SYMBOL ONTO AN OPTICAL CARRIER SIGNAL

(75) Inventor: Antonio D'Errico, Calci (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 87 days.

(21) Appl. No.: 14/385,154

(22) PCT Filed: Mar. 19, 2012

(86) PCT No.: PCT/EP2012/054814
§ 371 (c)(1),
(2), (4) Date: Jan. 5, 2015

(87) PCT Pub. No.: WO2013/139368
PCT Pub. Date: Sep. 26, 2013

(65) Prior Publication Data
US 2015/0104194 A1 Apr. 16, 2015

(51) Int. Cl.
*H04B 10/556* (2013.01)
*H04B 10/50* (2013.01)

(52) U.S. Cl.
CPC ...... *H04B 10/5561* (2013.01); *H04B 10/5051* (2013.01); *H04B 2210/003* (2013.01)

(58) Field of Classification Search
CPC .................. H04B 10/505–10/5055; H04B 10/516–10/5161; H04B 10/556–10/5561; H04B 2210/003
See application file for complete search history.

(56) References Cited

U.S. PATENT DOCUMENTS

| | | |
|---|---|---|
| 2006/0269294 A1 | 11/2006 | Kikuchi |
| 2011/0008054 A1 | 1/2011 | Castanon Avila |
| 2011/0091221 A1 | 4/2011 | De Gabory et al. |
| 2011/0182590 A1* | 7/2011 | Secondini .......... H04B 10/5161 398/186 |

FOREIGN PATENT DOCUMENTS

DE  100 01 014 A1  7/2001

OTHER PUBLICATIONS

Pot International Search Report, mailed Dec. 5, 2012, in connection with International Application No. PCT/EP2012/054814, all pages.
(Continued)

*Primary Examiner* — David Payne
*Assistant Examiner* — Casey Kretzer
(74) *Attorney, Agent, or Firm* — Leffler Intellectual Property Law, PLLC

(57) ABSTRACT

Phase shift keying optical modulation apparatus comprising optical phase shifting apparatus and an optical modulator. The optical phase shifting apparatus is arranged to receive an optical carrier signal and is arranged to selectively apply a preselected optical phase shift to the optical carrier signal in dependence on a symbol of a 2N-level phase shift keying modulation format to be encoded onto the optical signal. The optical modulator is arranged to receive the optical carrier signal from the optical phase shifting apparatus and is arranged to apply a phase modulation to the optical carrier signal in dependence on the symbol, to thereby encode the symbol onto the optical carrier signal. The phase modulation is a phase-modulation of an N-level phase shift keying modulation format.

13 Claims, 10 Drawing Sheets

(56) References Cited

OTHER PUBLICATIONS

Yu, J. et al. "Multilevel modulations and digital coherent detection" Optical Fiber Technology, Academic Press, London, US, vol. 15, No. 3, Jun. 1, 2009, pp. 197-208, XP026036103, ISSN: 1068-5200.
Tipsuwannakul, E. et al. "Transmission of 240 Gb/s PM-RZ-D8PSK over 320 km in 10 Gb/s NRZ-OOK WDM system" Optical Fiber Communication, Collocated National Fiber Optic Engineers Conference, 2010 conference on, IEEE, Piscataway, NJ, USA, Mar. 21, 2010, pp. 1-3, XP031676713.
Guo-Wei Lu et al. "Optical 8PSK transmitter using tandem IQ modulators with binary driving electrical signals" Lasers and Electro-Optics (CLEO), Laser Science to Photonic Applications-CLEO: 2011—Laser Science to Photonic Applications—May 1-6, 2011, Baltimore, MD, USA, IEEE, US, May 1, 2011, pp. 1-2, XP031891649, ISBN: 978-1-4577-1223-4.
Sakamoto, Takahide et al. "Electro-optic synthesis of multi-level coherent signals", OECC 2009, Jul. 13-17, 2009, pp. 1-2, IEEE, ISBN: 978-1-4244-4102-0.
Kim, Cheolhwan et al. "WDM Transmission over 320 km EDFA-Amplified SSMF Using 30 Gb/s Return-to-Zero Optical Differential 8-Level Phase-Shift Keying (OD8PSK)" pp. 1-6, Optical Society of America, vol. 13, No. 11/Optics Express 4044, May 30, 2005.
Bull, Jeffrey et al. "40 Ghz Electro-optic Polarization Modulator for Fiber Optic Communications Systems" Proceedings SPIE, vol. 5577, pp. 133-143, Society of Photo-Optical Instrumentation Engineers, 2004.
Chi, N. "Generation and transmission performance of 40 Gbit/s polarisation shift keying signal" IEEE Electronics Letters, vol. 41, No. 9, Feb. 3, 2005, pp. 1-2.
Sakamoto, Takahide et al. "Electro-optic synthesis of 8PSK by quad-parallel Mach-Zehnder modulator" 2009 Conference on Optical Fiber Communication, Mar. 22-26, 2009, pp. 1-3, IEEE, ISBN: 978-1-4244-2606-5.
Thorlabs "40 GHz Phase and Intensity Modulators" LN05S-FC, 1205, p. 1, Retrieved from the Internet at www.thorlabs.com on or before Mar. 19, 2012.
Yang, Yanfu et al. "An Optical Differential 8-PSK Modulator Using Cascaded QPSK Modulators" Paper P3.19, ECOC 2009, Sep. 20-24, 2009, Vienna, Austria, pp. 1-2, VDE Verlag GmbH, 978-3-8007-3173-2.

\* cited by examiner

| RF1 | RF2 | RF3 | Symbol |
|---|---|---|---|
| 0 | 0 | 0 | |
| 0 | 0 | 1 | |
| 0 | 1 | 0 | |
| 0 | 1 | 1 | |
| 1 | 0 | 0 | |
| 1 | 0 | 1 | |
| 1 | 1 | 0 | |
| 1 | 1 | 1 | |

PHASE SHIFT KEYING OPTICAL MODULATION APPARATUS AND METHOD OF ENCODING A SYMBOL ONTO AN OPTICAL CARRIER SIGNAL

TECHNICAL FIELD

The invention relates to phase shift keying optical modulation apparatus, an optical transmitter comprising the phase shift keying optical modulation apparatus and an optical communications network transponder comprising the phase shift keying optical modulation apparatus. The invention also relates to a method of encoding a symbol of a 2N-level phase shift keying modulation format onto an optical carrier signal.

BACKGROUND

Various optical multilevel modulation formats have been proposed to meet the increasing demand for capacity in optical communication systems. The Quadrature Phase Shift Keying, QPSK, modulation format has been investigated in long-haul transmission experiments due to its advantage of high nonlinear tolerance and better optical signal to noise ratio, OSNR, performance comparing with other alternative formats. Recently, optical differential 8-level phase shift keying, 8PSK, has been proposed to improve channel capacity in wavelength division multiplexed optical communication systems. It offers higher spectral efficiency than QPSK and can be used in high spectral efficiency direct detection or coherent detection optical communications systems.

The implementation of an 8PSK modulator typically uses an In-phase/Quadrature, IQ, QPSK modulator cascaded with a phase modulator. This structure is based on the fact that the symbols in the 8PSK constellation diagram can be divided in two QPSK constellation diagrams, rotated by $\pi/4$ with respect to one another. Hence, to generate 8PSK symbols, the device I/Q-modulates a continuous wave optical carrier signal to generate a symbol in a QPSK constellation diagram and then the phase modulator applied a phase shift to the modulated optical carrier signal to rotate the symbol by 0 or $\pi/4$, depending on the phase offset of the symbol to be transmitted.

The resulting 8PSK constellation diagram strongly depends on the driving voltage and the frequency response of the phase modulator. The voltage amplitude of the drive signal for the phase modulator has to be precisely tuned to obtain the desired phase shift of $\pi/4$. No technique to achieve automatic tuning of the driving voltage to meet this requirement has been reported, therefore phase shifts cannot be efficiently achieved, causing unwanted phase distortions within the 8PSK constellation diagram. Any bandwidth limitation or non-flat amplitude spectral response of the driving amplifier or of the phase modulator will translate directly into a deviation of the resulting 8PSK constellation diagram from the ideal one, and thus will impact on the performance of an optical communications system incorporating this type of 8PSK modulator, as reported by Takahide Sakamoto, et al, "Electro-optic synthesis of multi-level coherent signals", OECC 2009, Paper 545.

SUMMARY

It is an object to provide an improved phase shift keying optical modulation apparatus. It is a further object to provide an improved optical transmitter. It is a further object to provide an improved optical communications network transponder. It is a further object to provide an improved method of encoding a symbol of a 2N-level phase shift keying modulation format onto an optical carrier signal.

A first aspect of the invention provides phase shift keying optical modulation apparatus comprising optical phase shifting apparatus and an optical modulator. The optical phase shifting apparatus is arranged to receive an optical carrier signal. The optical phase shifting apparatus is arranged to selectively apply a preselected optical phase shift to the optical carrier signal in dependence on a symbol of a 2N-level phase shift keying modulation format to be encoded onto the optical signal. The optical modulator is arranged to receive the optical carrier signal from the optical phase shifting apparatus. The optical modulator is arranged to apply a phase modulation to the optical carrier signal in dependence on the symbol, to thereby encode the symbol onto the optical carrier signal. The phase modulation is a phase-modulation of an N-level phase shift keying modulation format.

The phase shift keying optical modulation apparatus enables a symbol of a 2N-level phase shift keying, 2N-PSK, constellation diagram to be generated by selecting one of two N-PSK constellation diagrams, which are phase shifted relative to each other, and then generating a respective symbol in the selected N-PSK constellation diagram. N is a positive integer. The N-PSK constellation diagram is selected by applying a pre-selected phase shift to the optical carrier signal and the symbol is then encoded onto the optical carrier signal by applying a respective phase modulation of the N-PSK modulation format. Applying a phase shift to the optical carrier signal before applying the phase modulation may enable a sharper and more repeatable phase shift to be achieved than in the prior art devices in which a phase shift is applied after generation of the symbol by phase modulation. This may enable a 2N-PSK constellation diagram generated using the apparatus of the present invention to more closely match the ideal, theoretical constellation diagram. Providing the optical phase shifting apparatus before the optical modulator may enable a sharper and more repeatable phase shift to be achieved than in the prior art devices in which a phase shifter is provided after the optical modulator.

In an embodiment, the N-level phase shift keying modulation format is one of binary phase shift keying and quadrature phase shift keying. The 2N-level phase shift keying modulation format is one of quadrature phase shift keying and eight-level phase shift keying respectively. A QPSK modulator may thus be provided having the same complexity as a BPSK modulator and an 8PSK modulator may be provided having the same complexity as a QPSK modulator, which may have an improved performance as compared to prior art 8PSK modulators.

In an embodiment, the optical phase shifting apparatus comprises a first optical path, a second optical path and an optical switch. The first optical path is arranged to apply a first phase shift to the optical carrier signal. The second optical path comprises an optical phase shifter arranged to apply the preselected optical phase shift, relative to the first optical phase shift, to the optical carrier signal. The optical switch is arranged to receive the optical carrier signal and is arranged to selectively route the optical carrier signal into one of the first optical path and the second optical path. The phase shift keying optical modulation apparatus further comprises a controller. The controller is arranged to generate and transmit to the optical switch a control signal arranged to cause the optical switch to route the optical carrier signal in dependence on the symbol. The controller is arranged to generate and transmit to the optical modulator a drive signal arranged to cause the optical modulator to apply the phase-modulation to the optical signal, to thereby encode the symbol onto the optical carrier signal.

The control signal and the drive signal do not require any signal correlation or coding in order to encode the symbol onto the optical carrier signal. This may simplify the structure of the phase shift keying optical modulation apparatus compared to the prior art. This may also simplify the structure of a corresponding optical receiver for receiving the encoded symbol, which may be based on a common coherent detection scheme without any de-correlation.

In an embodiment, the optical switch comprises a polarisation shift-keying modulator and a polarisation beam splitter. The optical switch may operate with a fast response and apply a sharp and repeatable pre-selected phase shift to the optical carrier signal. Using a simple passive polarisation beam splitter may enable a sharper phase shift to be applied to the optical carrier signal as compared to the prior art. It may also enable a precise offset definition and mean that tuning of RF electrical drive signals, as is the case in the prior art, is not required.

In an embodiment, the phase shift keying optical modulation apparatus additionally comprises encoding apparatus. The encoding apparatus is arranged to receive communications traffic bits to be transmitted and is arranged to map each bit into a respective symbol of a 2N-level phase shift keying modulation format. The optical switch has a switching time which is comparable to a baud rate of the communications traffic bits. This may enable the phase shift keying optical modulation apparatus to operate with a larger electro-optic bandwidth, of up to 50 GHz, than the prior art.

In an embodiment, the optical modulator is a multilevel phase shift keying phase modulator.

In an embodiment, the optical modulator is an optical IQ modulator and the optical phase shifting apparatus is arranged to selectively apply a $\pi/4$ phase shift. The phase shift keying optical modulation apparatus may therefore provide an 8PSK modulator having the same complexity as a QPSK modulator, which may have an improved performance as compared to prior art 8PSK modulators.

In an embodiment, the polarisation shift-keying modulator is arranged to operate with its two states of polarisation aligned with the main axes of the polarisation beam splitter, and the first optical path and the second optical path each have a main polarisation axis which is aligned with the main polarisation axes of the IQ modulator. This may enable maximum coupling between the optical paths and the IQ modulator. This may also enable the IQ modulator to operate with maximum modulation depth and minimum optical loss.

In an embodiment, the controller is arranged to generate first and second drive signals in dependence on the symbol, the drive signals being arranged to cause the optical IQ modulator to apply the phase-modulation to the optical signal. Each of the control signal and the first and second drive signals has a respective signal level. There is a unique correspondence between each symbol of the 2N-level phase shift keying modulation format and the signal levels of the respective control signal, first drive signal and second drive signal. A simple logic is therefore used to encode the symbol onto the optical carrier signal. This may simplify signal processing of communications traffic bits to be transmitted because no signal correlation among the traffic bits needs to be added.

In an embodiment, each of the control signal, first drive signal and second drive signal is a radio frequency electrical signal. The signals are synchronized taking into account a propagation time of the optical carrier signal from the optical switch to the optical IQ modulator.

In an embodiment, the optical modulator is a binary phase shift keying modulator and the optical phase shifting apparatus is arranged to selectively apply a $\pi/2$ phase shift. The phase shift keying optical modulation apparatus may therefore provide a QPSK modulator having the same complexity as a BPSK modulator.

In an embodiment, the first phase shift is one of a positive phase shift, a negative phase shift and a zero phase shift.

A second aspect of the invention provides an optical transmitter comprising an optical source arranged to generate an optical carrier signal and phase shift keying optical modulation apparatus. The phase shift keying optical modulation apparatus comprises optical phase shifting apparatus and an optical modulator. The optical phase shifting apparatus is arranged to receive an optical carrier signal. The optical phase shifting apparatus is arranged to selectively apply a preselected optical phase shift to the optical carrier signal in dependence on a symbol of a 2N-level phase shift keying modulation format to be encoded onto the optical signal. The optical modulator is arranged to receive the optical carrier signal from the optical phase shifting apparatus. The optical modulator is arranged to apply a phase modulation to the optical carrier signal in dependence on the symbol, to thereby encode the symbol onto the optical carrier signal. The phase modulation is a phase-modulation of an N-level phase shift keying modulation format.

The optical transmitter enables a symbol of a 2N-level phase shift keying, 2N-PSK, constellation diagram to be encoded onto an optical carrier signal by selecting one of two N-PSK constellation diagrams, which are phase shifted relative to each other, and then generating a respective symbol in the selected N-PSK constellation diagram. N is a positive integer. The N-PSK constellation diagram is selected by applying a pre-selected phase shift to the optical carrier signal and the symbol is then encoded onto the optical carrier signal by applying a respective phase modulation of the N-PSK modulation format. Applying a phase shift to the optical carrier signal before applying the phase modulation may enable a sharper and more repeatable phase shift to be achieved than in the prior art devices in which a phase shift is applied after generation of the symbol by phase modulation. This may enable symbols of a 2N-PSK constellation diagram generated using the optical transmitter of the present invention to more closely match the ideal, theoretical constellation diagram. Providing the optical phase shifting apparatus before the optical modulator may enable a sharper and more repeatable phase shift to be achieved than in the prior art devices in which a phase shifter is provided after the optical modulator.

In an embodiment, the N-level phase shift keying modulation format is one of binary phase shift keying and quadrature phase shift keying. The 2N-level phase shift keying modulation format is one of quadrature phase shift keying and eight-level phase shift keying respectively. A QPSK modulator may thus be provided having the same complexity as a BPSK modulator and an 8PSK modulator may be provided having the same complexity as a QPSK modulator, which may have an improved performance as compared to prior art 8PSK modulators.

In an embodiment, the optical phase shifting apparatus comprises a first optical path, a second optical path and an optical switch. The first optical path is arranged to apply a first phase shift to the optical carrier signal. The second optical path comprises an optical phase shifter arranged to apply the preselected optical phase shift, relative to the first optical phase shift, to the optical carrier signal. The optical switch is arranged to receive the optical carrier signal and is arranged to selectively route the optical carrier signal into one of the first optical path and the second optical path. The phase shift keying optical modulation apparatus further comprises a controller. The controller is arranged to generate and transmit to the optical switch a control signal arranged to cause the optical switch to route the optical carrier signal in dependence on the symbol. The controller is arranged to generate and transmit to the optical modulator a drive signal arranged to cause the optical modulator to apply the phase-modulation to the optical signal, to thereby encode the symbol onto the optical carrier signal.

The control signal and the drive signal do not require any signal correlation or coding in order to encode the symbol onto the optical carrier signal. This may simplify the structure of the optical transmitter compared to the prior art. This may also simplify the structure of a corresponding optical receiver for receiving the encoded symbol, which may be based on a common coherent detection scheme without any de-correlation.

In an embodiment, the optical switch comprises a polarisation shift-keying modulator and a polarisation beam splitter. The optical switch may operate with a fast response and apply a sharp and repeatable pre-selected phase shift to the optical carrier signal. Using a simple passive polarisation beam splitter may enable a sharper phase shift to be applied to the optical carrier signal as compared to the prior art. It may also enable a precise offset definition and mean that tuning of RF electrical drive signals, as is the case in the prior art, is not required.

In an embodiment, the optical transmitter additionally comprises encoding apparatus. The encoding apparatus is arranged to receive communications traffic bits to be transmitted and is arranged to map each bit into a respective symbol of a 2N-level phase shift keying modulation format. The optical switch has a switching time which is comparable to a baud rate of the communications traffic bits. This may enable the optical transmitter to operate with a larger electro-optic bandwidth, of up to 50 GHz, than the prior art.

In an embodiment, the optical modulator is a multilevel phase shift keying phase modulator.

In an embodiment, the optical modulator is an optical IQ modulator and the optical phase shifting apparatus is arranged to selectively apply a $\pi/4$ phase shift. The optical transmitter may therefore encode 8PSK constellation symbols using phase shift keying optical modulation apparatus having the same complexity as a QPSK modulator, and which may have an improved performance as compared to prior art optical transmitters.

In an embodiment, the polarisation shift-keying modulator is arranged to operate with its two states of polarisation aligned with the main axes of the polarisation beam splitter, and the first optical path and the second optical path each have a main polarisation axis which is aligned with the main polarisation axes of the IQ modulator. This may enable maximum coupling between the optical paths and the IQ modulator. This may also enable the IQ modulator to operate with maximum modulation depth and minimum optical loss.

In an embodiment, the controller is arranged to generate first and second drive signals in dependence on the symbol, the drive signals being arranged to cause the optical IQ modulator to apply the phase-modulation to the optical signal. Each of the control signal and the first and second drive signals has a respective signal level. There is a unique correspondence between each symbol of the 2N-level phase shift keying modulation format and the signal levels of the respective control signal, first drive signal and second drive signal. A simple logic is therefore used to encode the symbol onto the optical carrier signal. This may simplify signal processing of communications traffic bits to be transmitted because no signal correlation among the traffic bits needs to be added.

In an embodiment, each of the control signal, first drive signal and second drive signal is a radio frequency electrical signal. The signals are synchronized taking into account a propagation time of the optical carrier signal from the optical switch to the optical IQ modulator.

In an embodiment, the optical modulator is a binary phase shift keying modulator and the optical phase shifting apparatus is arranged to selectively apply a $\pi/2$ phase shift. The optical transmitter may therefore encode QPSK constellation symbols using phase shift keying optical modulation apparatus having the same complexity as a BPSK modulator, and which may have an improved performance as compared to prior art optical transmitters.

In an embodiment, the first phase shift is one of a positive phase shift, a negative phase shift and a zero phase shift.

A third aspect of the invention provides an optical communications network transponder comprising an optical source arranged to generate an optical carrier signal and phase shift keying optical modulation apparatus. The phase shift keying optical modulation apparatus comprises optical phase shifting apparatus and an optical modulator. The optical phase shifting apparatus is arranged to receive an optical carrier signal. The optical phase shifting apparatus is arranged to selectively apply a preselected optical phase shift to the optical carrier signal in dependence on a symbol of a 2N-level phase shift keying modulation format to be encoded onto the optical signal. The optical modulator is arranged to receive the optical carrier signal from the optical phase shifting apparatus. The optical modulator is arranged to apply a phase modulation to the optical carrier signal in dependence on the symbol, to thereby encode the symbol onto the optical carrier signal. The phase modulation is a phase-modulation of an N-level phase shift keying modulation format.

The optical communications network transponder enables a symbol of a 2N-level phase shift keying, 2N-PSK, constellation diagram to be encoded onto an optical carrier signal by selecting one of two N-PSK constellation diagrams, which are phase shifted relative to each other, and then generating a respective symbol in the selected N-PSK constellation diagram. N is a positive integer. The N-PSK constellation diagram is selected by applying a pre-selected phase shift to the optical carrier signal and the symbol is then encoded onto the optical carrier signal by applying a respective phase modulation of the N-PSK modulation format. Applying a phase shift to the optical carrier signal before applying the phase modulation may enable a sharper and more repeatable phase shift to be achieved than in the prior art devices in which a phase shift is applied after generation of the symbol by phase modulation. This may enable symbols of a 2N-PSK constellation diagram generated using the optical communications network transponder of the present invention to more closely match the ideal, theoretical constellation diagram. Providing the optical phase shifting apparatus before the optical modulator may enable a sharper and more repeatable phase shift to be achieved than in the prior art devices in which a phase shifter is provided after the optical modulator.

In an embodiment, the N-level phase shift keying modulation format is one of binary phase shift keying and quadrature phase shift keying. The 2N-level phase shift keying modulation format is one of quadrature phase shift keying and eight-level phase shift keying respectively. A QPSK modulator may thus be provided having the same complexity as a BPSK modulator and an 8PSK modulator may be provided having the same complexity as a QPSK modulator, which may have an improved performance as compared to prior art 8PSK modulators.

In an embodiment, the optical phase shifting apparatus comprises a first optical path, a second optical path and an optical switch. The first optical path is arranged to apply a first phase shift to the optical carrier signal. The second optical path comprises an optical phase shifter arranged to apply the preselected optical phase shift, relative to the first optical phase shift, to the optical carrier signal. The optical switch is arranged to receive the optical carrier signal and is arranged to selectively route the optical carrier signal into one of the first optical path and the second optical path. The phase shift keying optical modulation apparatus further comprises a controller. The controller is arranged to generate and transmit to the optical switch a control signal arranged to cause the optical switch to route the optical carrier signal in dependence on the symbol. The controller is arranged to generate and transmit to the optical modulator a drive signal arranged to cause the optical modulator to apply the phase-modulation to the optical signal, to thereby encode the symbol onto the optical carrier signal.

The control signal and the drive signal do not require any signal correlation or coding in order to encode the symbol onto the optical carrier signal. This may simplify the structure of the optical communications network transponder compared to the prior art. This may also simplify the structure of a corresponding optical receiver for receiving the encoded symbol, which may be based on a common coherent detection scheme without any de-correlation.

In an embodiment, the optical switch comprises a polarisation shift-keying modulator and a polarisation beam splitter. The optical switch may operate with a fast response and apply a sharp and repeatable pre-selected phase shift to the optical carrier signal. Using a simple passive polarisation beam splitter may enable a sharper phase shift to be applied to the optical carrier signal as compared to the prior art. It may also enable a precise offset definition and mean that tuning of RF electrical drive signals, as is the case in the prior art, is not required.

In an embodiment, the optical communications network transponder additionally comprises encoding apparatus. The encoding apparatus is arranged to receive communications traffic bits to be transmitted and is arranged to map each bit into a respective symbol of a 2N-level phase shift keying modulation format. The optical switch has a switching time which is comparable to a baud rate of the communications traffic bits. This may enable the optical communications network transponder to operate with a larger electro-optic bandwidth, of up to 50 GHz, than the prior art.

In an embodiment, the optical modulator is a multilevel phase shift keying phase modulator.

In an embodiment, the optical modulator is an optical IQ modulator and the optical phase shifting apparatus is arranged to selectively apply a $\pi/4$ phase shift. The optical communications network transponder may therefore encode 8PSK constellation symbols using phase shift keying optical modulation apparatus having the same complexity as a QPSK modulator, and which may have an improved performance as compared to prior art optical communications network transponders.

In an embodiment, the polarisation shift-keying modulator is arranged to operate with its two states of polarisation aligned with the main axes of the polarisation beam splitter, and the first optical path and the second optical path each have a main polarisation axis which is aligned with the main polarisation axes of the IQ modulator. This may enable maximum coupling between the optical paths and the IQ modulator. This may also enable the IQ modulator to operate with maximum modulation depth and minimum optical loss.

In an embodiment, the controller is arranged to generate first and second drive signals in dependence on the symbol, the drive signals being arranged to cause the optical IQ modulator to apply the phase-modulation to the optical signal. Each of the control signal and the first and second drive signals has a respective signal level. There is a unique correspondence between each symbol of the 2N-level phase shift keying modulation format and the signal levels of the respective control signal, first drive signal and second drive signal. A simple logic is therefore used to encode the symbol onto the optical carrier signal. This may simplify signal processing of communications traffic bits to be transmitted because no signal correlation among the traffic bits needs to be added.

In an embodiment, each of the control signal, first drive signal and second drive signal is a radio frequency electrical signal. The signals are synchronized taking into account a propagation time of the optical carrier signal from the optical switch to the optical IQ modulator.

In an embodiment, the optical modulator is a binary phase shift keying modulator and the optical phase shifting apparatus is arranged to selectively apply a $\pi/2$ phase shift. The optical communications network transponder may therefore encode QPSK constellation symbols using phase shift keying optical modulation apparatus having the same complexity as a BPSK modulator, and which may have an improved performance as compared to prior art optical communications network transponders.

In an embodiment, the first phase shift is one of a positive phase shift, a negative phase shift and a zero phase shift.

A fourth aspect of the invention provides a method of encoding a symbol of a 2N-level phase shift keying modulation format onto an optical carrier signal. The method comprises step a. of receiving an optical carrier signal and step b. of selectively applying a pre-selected phase shift to the optical carrier signal in dependence on the symbol. The method further comprises step c. of applying a phase modulation of an N-level phase shift keying modulation format to the optical carrier signal in dependence on the symbol.

The method enables a symbol of a 2N-level phase shift keying, 2N-PSK, constellation diagram to be encoded onto an optical carrier signal by selecting one of two N-PSK constellation diagrams, which are phase shifted relative to each other, and then generating a respective symbol in the selected N-PSK constellation diagram. N is a positive integer. The N-PSK constellation diagram is selected by applying a pre-selected phase shift to the optical carrier signal and the symbol is then encoded onto the optical carrier signal by applying a respective phase modulation of the N-PSK modulation format. Applying a phase shift to the optical carrier signal before applying the phase modulation may enable a sharper and more repeatable phase shift to be achieved than in the prior art devices in which a phase shift is applied after generation of the symbol by phase modulation. This may enable symbols of a 2N-PSK constellation diagram generated using the method of the present invention to more closely match the ideal, theoretical constellation diagram. Applying an optical phase shift before applying a phase modulation may enable a sharper and more repeatable phase shift to be achieved than in prior art method in which a phase shift is applied after phase modulation.

In an embodiment, the N-level phase shift keying modulation format is binary phase shift keying and the 2N-level phase shift keying modulation format is quadrature phase shift keying, and the pre-selected phase shift is π/2. The method may therefore be used to encode QPSK constellation symbols using the lower complexity BPSK modulation format, and may offer an improved performance as compared to the prior art.

In an embodiment, the N-level phase shift keying modulation format is quadrature phase shift keying and the 2N-level phase shift keying modulation format is eight-level phase shift keying, and the pre-selected phase shift is π/4. The method may therefore be used to encode 8PSK constellation symbols using the lower complexity QPSK modulation format, and may offer an improved performance as compared to the prior art.

A fifth aspect of the invention provides a data carrier having computer readable instructions embodied therein, the said computer readable instructions being for providing access to resources available on a processor and the computer readable instructions comprising instructions to cause the processor to perform any of the above steps of the method of encoding a symbol of a 2N-level phase shift keying modulation format onto an optical carrier signal.

Embodiments of the invention will now be described, by way of example only, with reference to the accompanying drawings.

DETAILED DESCRIPTION

Figure 1:
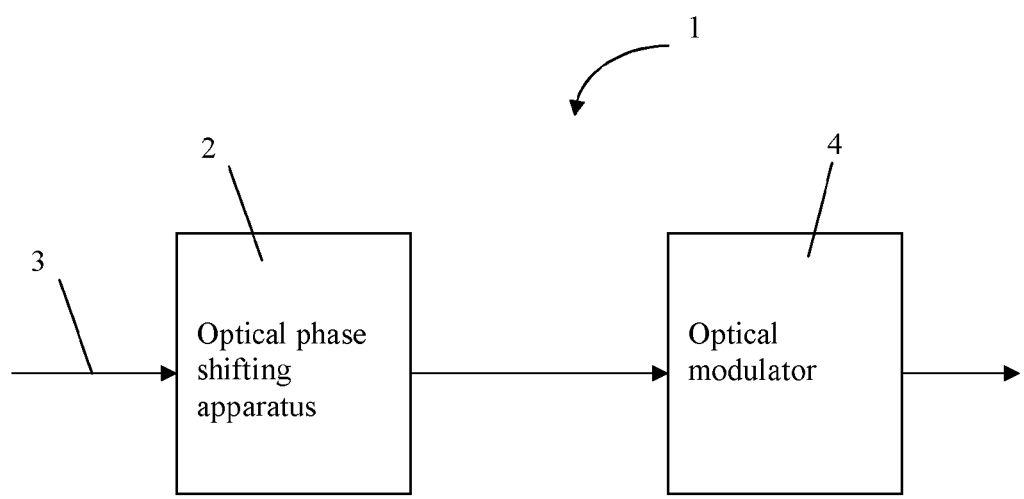
FIG. 1 is a schematic representation of phase shift keying optical modulation apparatus according to a first embodiment of the invention.

Referring to FIG. 1, a first embodiment of the invention provides a phase shift keying (PSK) optical modulation apparatus 1 comprising optical phase shifting apparatus 2 and an optical modulator 4. The optical phase shifting apparatus 2 is arranged to receive an optical carrier signal 3. The optical phase shifting apparatus 2 is arranged to selectively apply a pre-selected optical phase shift to the optical carrier signal in dependence on a symbol of a 2N-level PSK modulation format to be encoded onto the optical signal.

The optical modulator 4 is arranged to receive the optical carrier signal from the optical phase shifting apparatus 2. The optical modulator 4 is arranged to apply a phase modulation to the optical carrier signal in dependence on the symbol, to encode the symbol onto the optical carrier signal. The phase modulation is a phase modulation of an N-level PSK modulation format.

Figure 2:
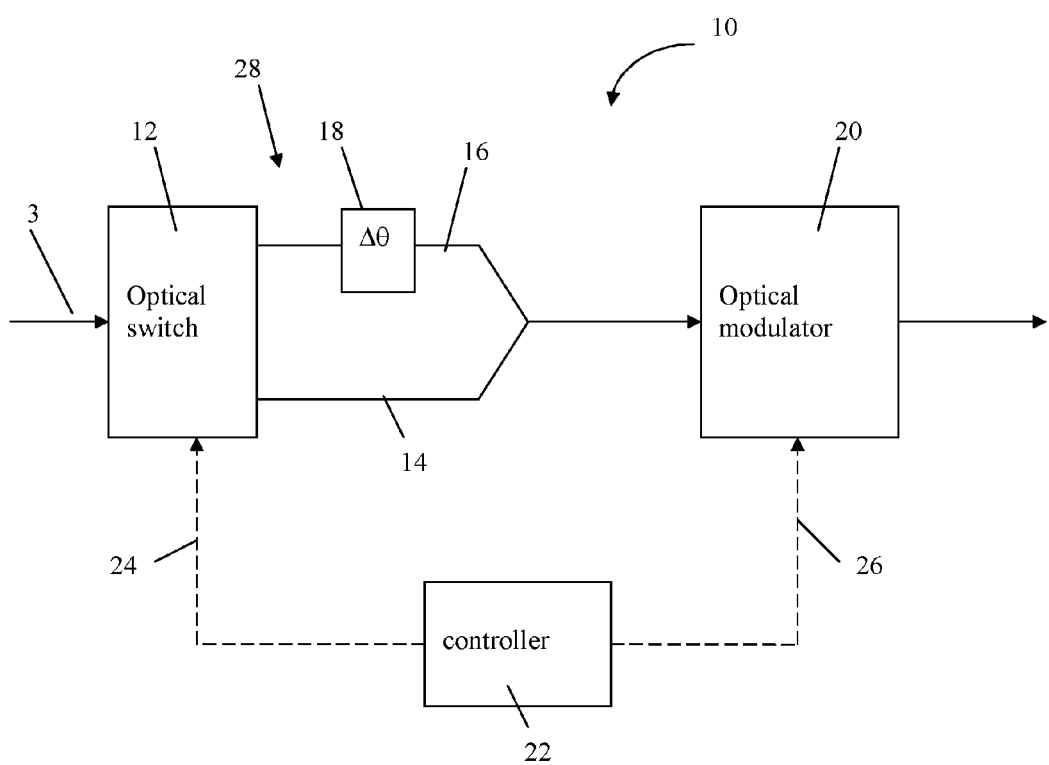
FIG. 2 is a schematic representation of phase shift keying optical modulation apparatus according to a second embodiment of the invention.

PSK optical modulation apparatus 10 according to a second embodiment of the invention is shown in FIG. 2. The PSK optical modulation apparatus 10 comprises optical phase shifting apparatus 28, an optical modulator 20 and a controller 22.

The optical phase shifting apparatus 28 of this embodiment comprises an optical switch 12, a first optical path 14 and a second optical path 16. The first optical path 14 is arranged to apply a first phase shift to the optical carrier signal 3. The second optical path 16 comprises an optical phase shifter 18 which is arranged to apply a preselected optical phase shift, Δθ, relative to the first optical phase shift, to the optical carrier signal. The optical switch 12 is arranged to receive the optical carrier signal 3 and is arranged to selectively route the optical carrier signal into one of the first optical path and the second optical path.

The controller 22 is arranged to generate and transmit a control signal 24 to the optical switch. The control signal 24 is arranged to cause the optical switch 12 to route the optical carrier signal in dependence on a symbol of a 2N-level PSK modulation format which is to be encoded onto the optical carrier signal. The controller 22 is also arranged to generate a drive signal 26 and to transmit the drive signal to the optical modulator 20. The drive signal 26 is arranged to cause the optical modulator to apply a phase modulation to the optical carrier signal in dependence on the symbol, to thereby encode the symbol onto the optical carrier signal. The phase modulation is a phase modulation of an N-level PSK modulation format.

Figure 3:
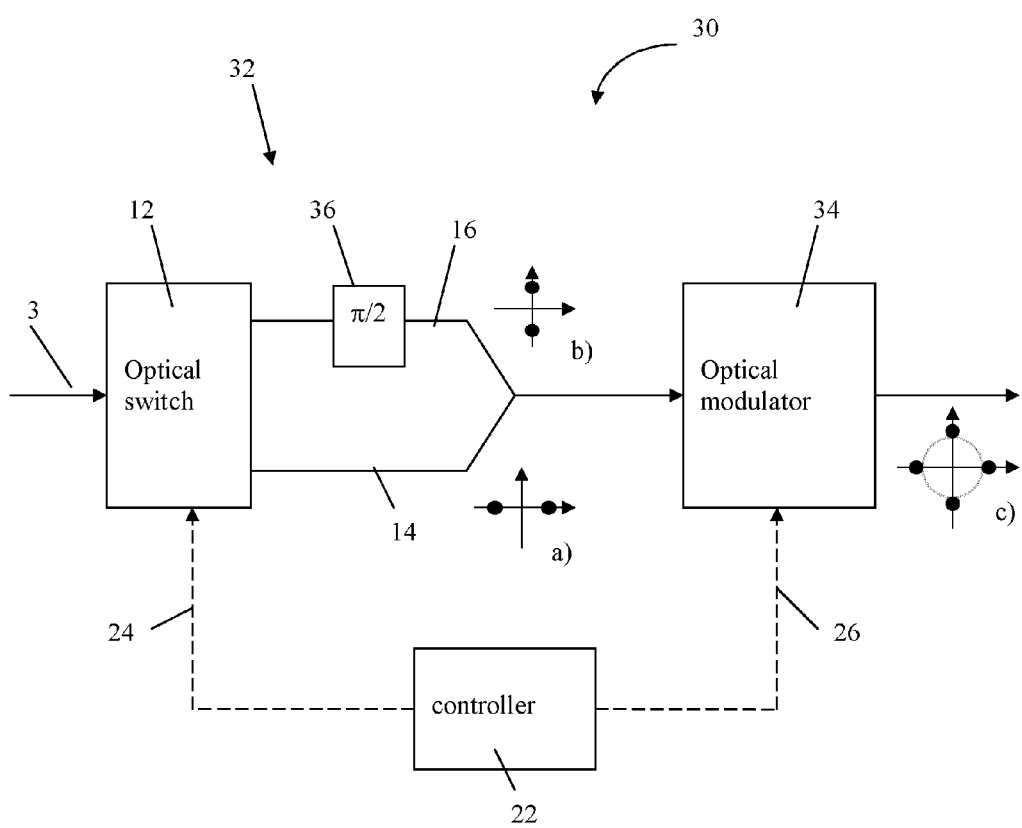
FIG. 3 is a schematic representation of phase shift keying optical modulation apparatus according to a third embodiment of the invention.

PSK optical modulation apparatus 30 according to a third embodiment of the invention is shown in FIG. 3. The apparatus 30 of this embodiment is similar to the apparatus 10 of FIG. 2, with the following modifications. The same reference numbers are retained for corresponding features.

In this embodiment, the optical modulator 34 is arranged to apply a binary phase shift keying, BPSK, (N-level) modulation format to the optical carrier signal and the PSK optical modulation apparatus 30 of this embodiment is therefore a QPSK (2N-level) optical modulation apparatus. N is the positive integer 2.

The optical phase shifter 36, provided in the second optical path 16 of the optical phase shifting apparatus 32, is arranged to apply a π/2 phase shift to the optical carrier signal. The first optical path 14 is arranged to apply a first phase shift, in this example a phase shift of zero, to the optical carrier signal. The second optical path 16 has the same physical length as the first optical path 14 but the optical phase shifter 36 is arranged to apply a π/2 phase shift to the optical carrier signal. On exiting the optical phase shifting apparatus 32 the optical carrier signal will therefore have had a zero phase shift or a π/2 phase shift applied to it, depending upon which optical path it propagate along.

On receiving the optical carrier signal from the second optical path 16 (zero phase shift applied) the optical modulator 34 will generate symbols of the BPSK constellation diagram shown in inset figure a), the symbols lying on the real axis. On receiving the optical carrier signal from the first optical path 14 (π/2 phase shift applied) the optical modulator 34 will generate symbols of the BPSK constellation diagram shown in inset figure b), the symbols lying on the imaginary axis. The four symbols of the QPSK constellation diagram, as shown in inset figure c), can therefore each be generated.

Figure 4:
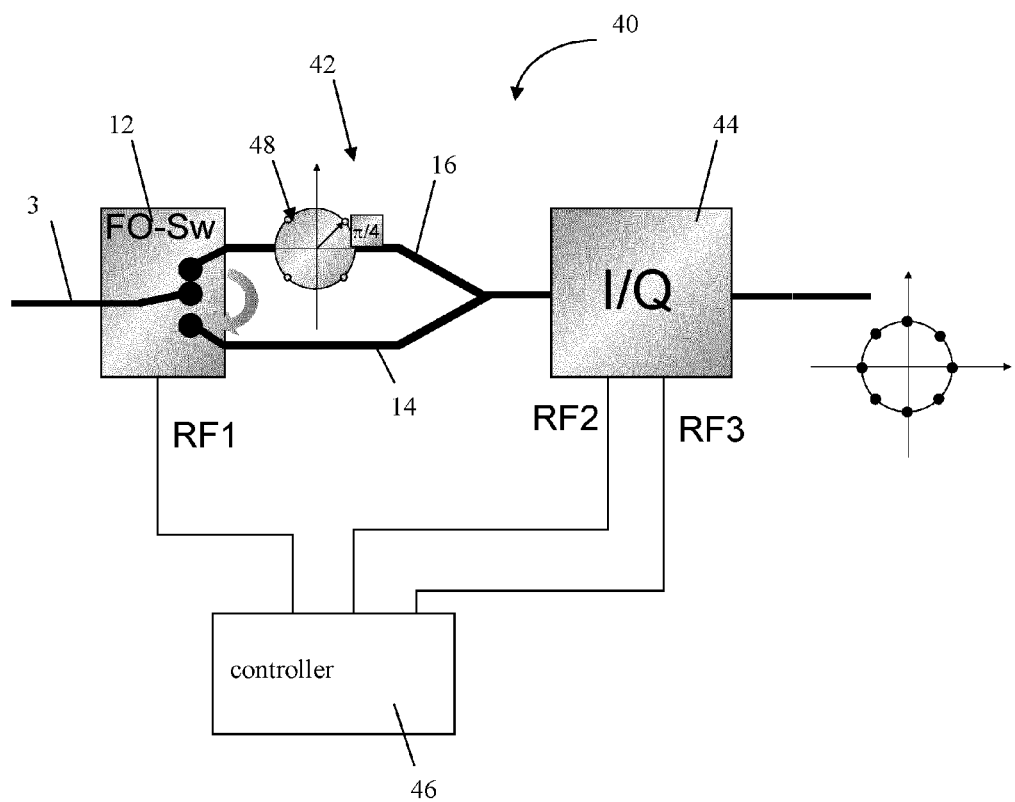
FIG. 4 is a schematic representation of phase shift keying optical modulation apparatus according to a fourth embodiment of the invention.
Figure 5:
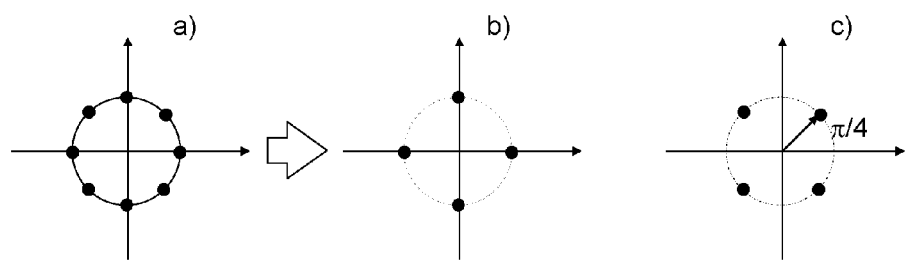
FIG. 5 illustrates how an 8PSK constellation diagram (a) may be constructed from a first QPSK constellation diagram (b) and a second QPSK constellation diagram (c) phase shifted relative to the first QPSK constellation diagram.

Referring to FIGS. 4 and 5, a fourth embodiment of the invention provides PSK optical modulation apparatus 40 which is similar to the apparatus 10 of FIG. 2, with the following modification. The same reference numbers are retained for corresponding features.

In this embodiment the optical phase shifter 48 is arranged to apply a π/4 phase shift to the optical carrier signal 3.

The optical modulator is an optical IQ modulator 44 and comprises first and second Mach-Zehnder modulators and a π/2 phase shifter (not shown). The structure and operation of an optical IQ modulator 44 will be well known to the person skilled in the art, and is described below and shown in FIG. 6. The optical IQ modulator 44 is arranged to apply a phase modulation of a QPSK (N-level) modulation format to the optical signal. The PSK optical modulation apparatus 40 of this embodiment is therefore an 8PSK (2N-level) optical modulation apparatus. N is the positive integer 4.

The controller 46 is arranged to generate and transmit an optical switch control signal RF1 to the optical switch 12. The control signal is arranged to cause the optical switch 12 to route the optical carrier signal in dependence on a symbol of an 8PSK modulation format to be encoded onto the optical signal. The controller 46 is arranged to generate a first drive signal RF2 and the second drive signal RF3 for controlling the operation of the two Mach-Zehnder modulators of the optical IQ modulator 44. The drive signals RF2, RF3 are arranged to cause the optical IQ modulator 44 to apply a phase modulation of a QPSK modulation format to the optical signal.

As shown in FIG. 5a), an 8PSK symbol constellation diagram can be formed from two phase offset QPSK constellation diagrams, shown in FIGS. 5b) and 5c). The optical switch 12 therefore acts to route the optical carrier signal to the first optical path 14 in order to generate one of the symbols in the QPSK constellation diagram shown in FIG. 5b) and is arranged to route the optical carrier signal into the second optical path 16 if one of the symbols of the π/4 phase shifted QPSK constellation diagram shown in FIG. 5c) is to be generated. The first and second drive signals RF2, RF3 are arranged to cause the optical IQ modulator 44 to encode the appropriate one of the four symbols of the chosen QPSK constellation diagram, corresponding to the desired 8PSK symbol to be encoded, onto the optical carrier signal.

Figure 6:
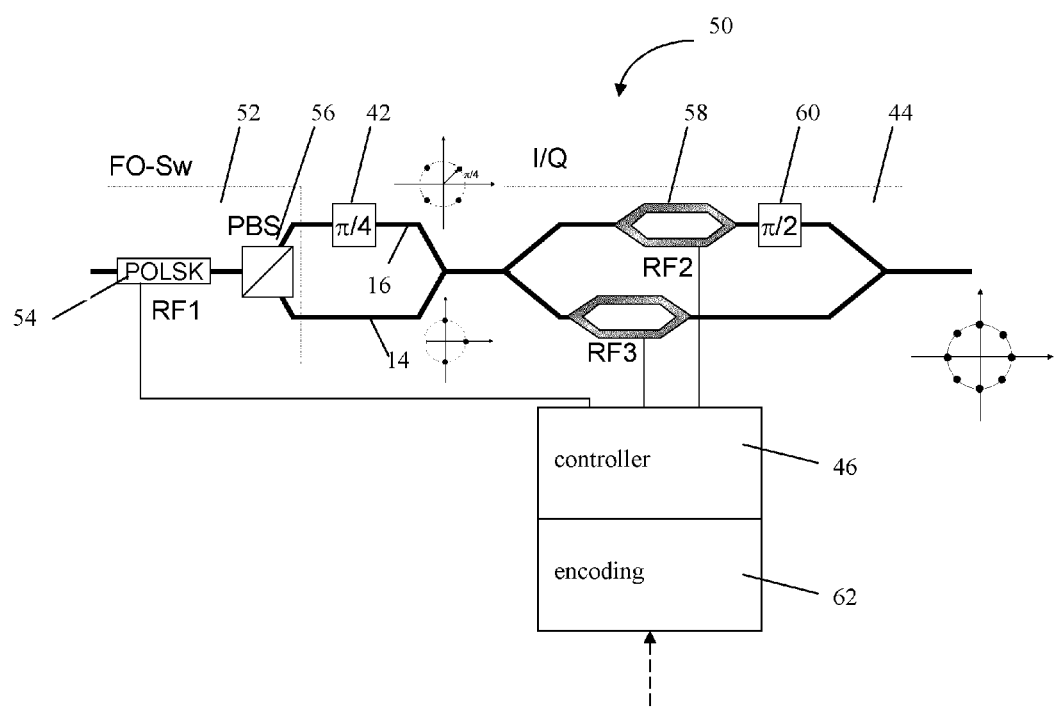
FIG. 6 is a schematic representation of phase shift keying optical modulation apparatus according to a fifth embodiment of the invention.
Figures 7, 8:
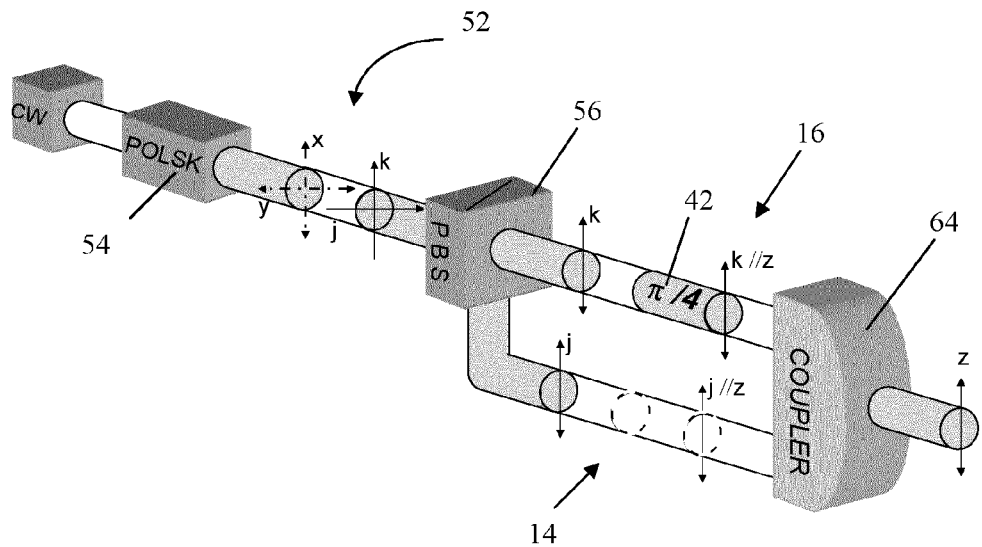
FIG. 7 is a schematic representation of the optical phase shifting apparatus of FIG. 6.
FIG. 8 illustrates the signal logic levels required to encode 8PSK symbols using the apparatus of FIG. 6.

Referring to FIGS. 6 to 8, a fifth embodiment of the invention provides PSK optical modulation apparatus 50 which is similar to the PSK optical modulation apparatus 40 shown in FIG. 4, with the following modifications. The same reference numbers are retained for corresponding features.

FIG. 6 shows the structure of the optical IQ modulator 44, which comprises first and second Mach-Zehnder modulators 58, controlled by the drive signals RF2, RF3, as described above, and a π/2 phase shifter 60. The structure and operation of an optical IQ modulator will be well known to the person skilled in the art and so it will not be described in further detail here.

In this embodiment, the optical switch 52 comprises a polarization shift keying, POLSK, modulator 54 and a polarisation beam splitter, PBS, 56. The POLSK modulator 54 is arranged to apply one of a first polarisation state, k, and a second polarisation state, j, to the optical carrier signal. The first and second polarisation states correspond to the main axes of polarisation of the PBS 56.

The optical carrier signal 3 is polarisation modulated by the POLSK modulator 54 to have one of the first and second polarization states. The polarised optical carrier signal is received by the PBS 56 and is routed by the PBS according to its polarisation state into either the first optical path 14 or the second optical path 16, as shown in more detail in FIG. 7. Optical carrier signals having the first polarisation state are transmitted through the PBS to the second optical path 16, and maintain their polarisation. Optical carrier signals having the second polarisation state are reflected during transmission through the PBS 56 and therefore have their polarization state rotated by 90°, so that the second polarisation state, j, of an optical carrier signal in the first optical path 14 is parallel to the polarisation state, k, of optical signals propagating through the second optical path 16.

A coupler 64 is provided at the ends of the first and second optical paths 14, 16 in order to couple the optical paths into a single output optical path for connection to the optical IQ modulator 44.

Optical carrier signals output from either of the first and second optical paths 14, 16 therefore have the same polarisation state, labeled z, which is aligned to the main polarisation axis of each of the Mach-Zehnder modulators 58 of the optical IQ modulator 44. This ensures maximum coupling of the optical carrier signal into the Mach-Zehnder modulators, maximum modulation depth applied to the optical carrier signal by the Mach-Zehnder modulators and minimum optical loss within the optical IQ modulator 44. The high modulation depth which is achievable provides high margins on the modulation depth which overcomes the problem faced by prior art 8PSK modulators of generated constellation diagrams strongly depending on the driving voltage and frequency response of the phase shifter.

In this embodiment, the PSK optical modulation apparatus 50 additionally comprises encoding apparatus 62 which is arranged to receive communications traffic bits to be transmitted. The encoding apparatus 62 is arranged to map each traffic bit into a respective symbol of the 8PSK modulation format.

The optical switch 52 has a switching time which is comparable to the baud rate of the communications traffic bits.

The optical switch control signal RF1 and the Mach-Zehnder modulator drive signals RF2, RF3 are synchronised, taking into account the propagation delay between the POLSK modulator 54 and the optical IQ modulator 44.

The control and drive signal logic required to generate each of the 8PSK constellation symbols is shown in FIG. 8.

Unlike prior art arrangements, the 8PSK modulation apparatus 50 does not require any correlation or coding to be applied to the drive signals or the control signal. This simplifies the signal processing before transmission and after detection since no signal correlation between the traffic bits is added. The necessary structure of an 8PSK receiver for receiving and decoding the transmitted symbols can therefore be based on a common coherent detection scheme in which no further received bit de-correlation is performed.

The use of the POLSK modulator 54 in combination with the optical IQ modulator 44 enables the 8PSK optical modulation apparatus 50 to have a fast response and enables sharp and repeatable phase shifts to be applied to the optical carrier signal in order to select the appropriate set of QPSK constellation symbols.

The use of a simple passive PBS 56 enables sharper phase shifts to be applied to the optical carrier signal, providing shaper changes between the two QPSK constellation diagrams and more accurate agreement of the resulting 8PSK symbol constellation diagram with the ideal, theoretical 8PSK constellation diagrams.

Figure 9:
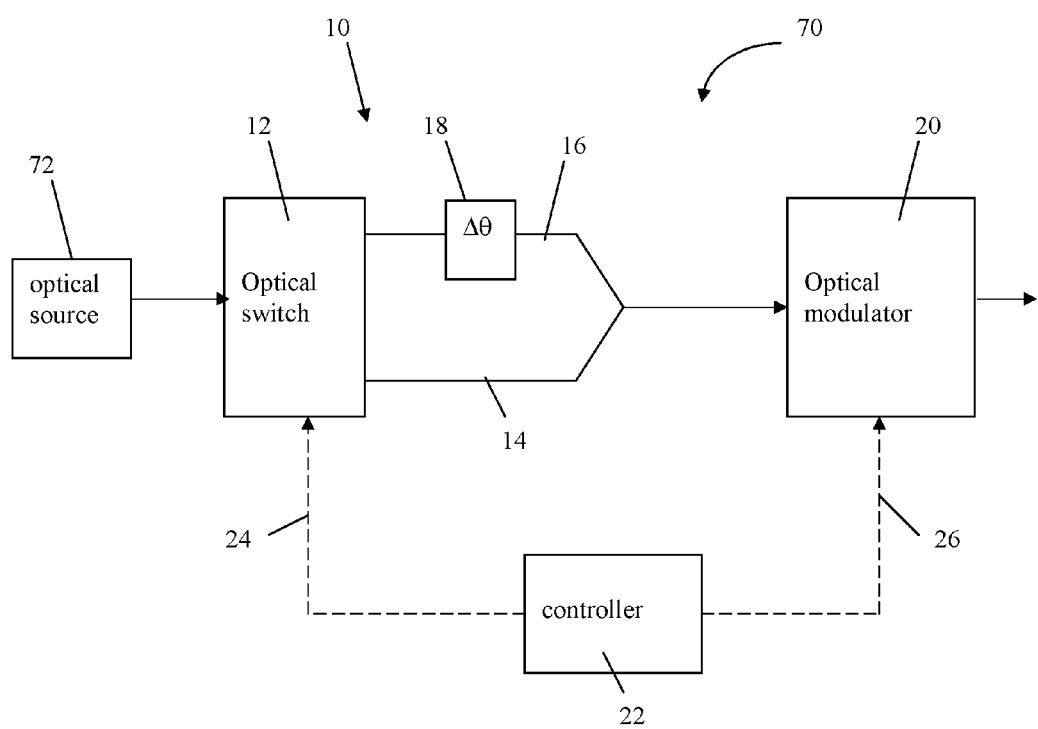
FIG. 9 is a schematic representation of an optical transmitter according to a sixth embodiment of the invention.

An optical transmitter 70 according to a sixth embodiment of the invention is shown in FIG. 9. The optical transmitter 70 comprises an optical source 72 arranged to generate an optical carrier signal and PSK optical modulation apparatus 10 as shown in FIG. 2.

Figure 10:
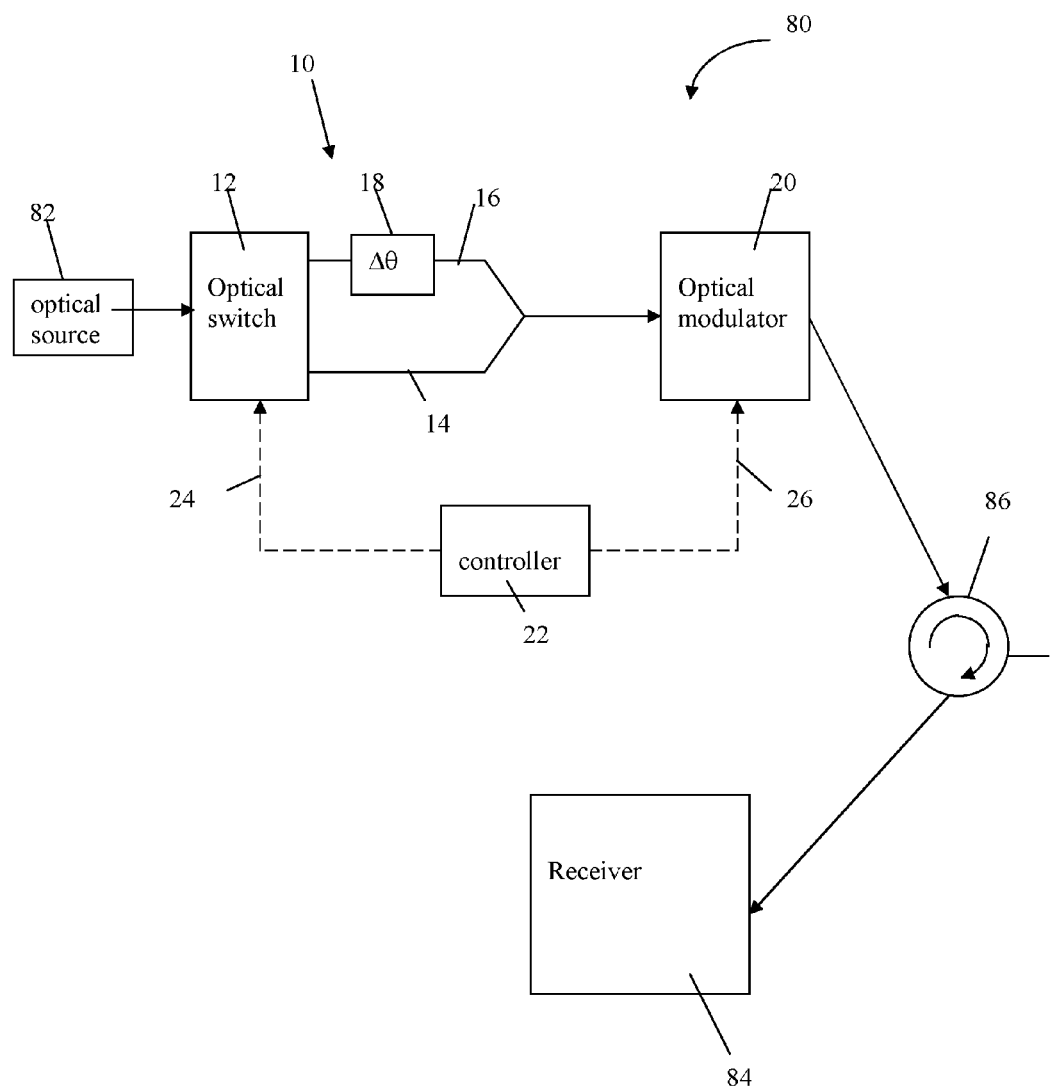
FIG. 10 is a schematic representation of an optical communications network transponder according to a seventh embodiment of the invention.
Figure 11:
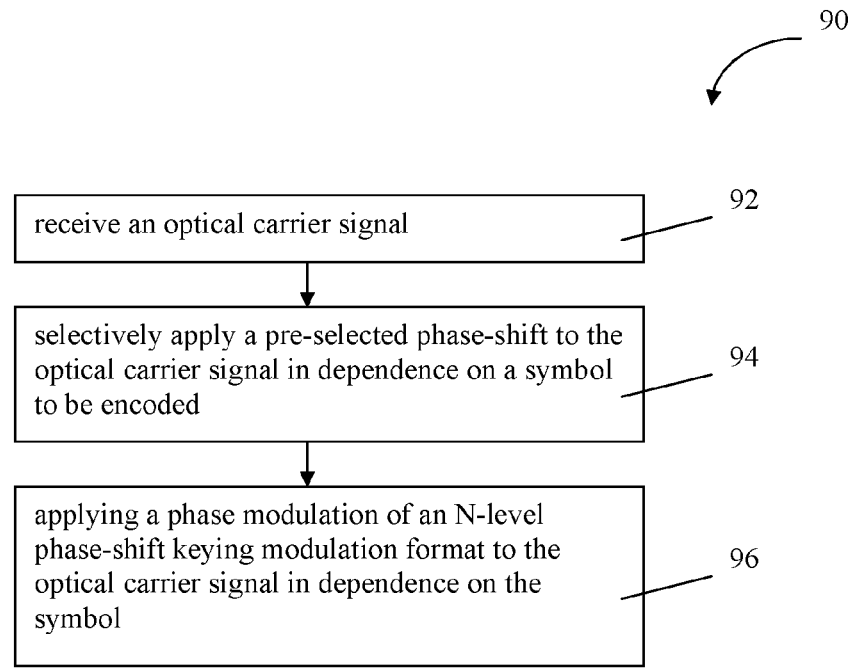
FIG. 11 shows the steps of a method according to an eighth embodiment of the invention of encoding a symbol of a 2N-level phase shift keying modulation format onto an optical carrier signal.

A seventh embodiment of the invention provides an optical communications network transponder 80 as shown in FIG. 10. The optical communications network transponder 80 comprises an optical source 82 arranged to generate an optical carrier signal and PSK optical modulation apparatus 10 as shown in FIG. 2.

As will be understood by the person skilled in the art, the transponder 80 further comprises a receiver 84 and routing means, such as an optical circulator 86, for routing downstream and upstream optical signals out of and into the transponder 80.

An eighth embodiment of the invention provides a method 90 of encoding a symbol of a 2N-level PSK modulation format onto an optical carrier signal.

The method 90 comprises receiving an optical carrier signal 92 and selectively applying a preselected phase shift to the optical carrier signal, in dependence on the symbol to be encoded 94. The method 90 subsequently comprises applying a phase modulation of an N-level PSK modulation format to the optical carrier signal in dependence on the symbol 96.

Figure 12:
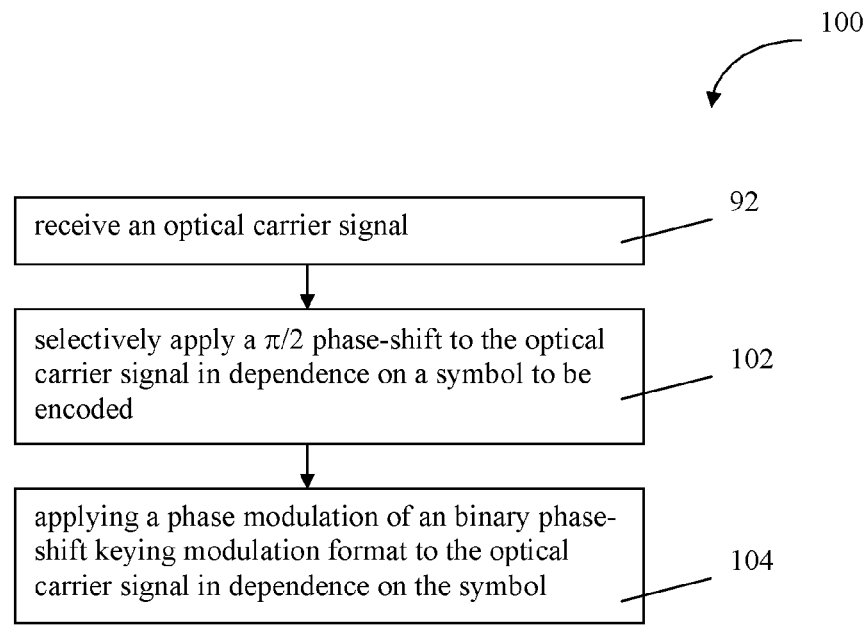
FIG. 12 shows the steps of a method according to a ninth embodiment of the invention of encoding a symbol of a 2N-level phase shift keying modulation format onto an optical carrier signal.

FIG. 12 shows the steps of a method 100 according to a ninth embodiment of the invention of encoding the symbol of a QPSK (2N-level) modulation format onto an optical carrier signal. The method comprises receiving an optical carrier signal 92 and selectively applying a π/2 phase shift to the optical carrier signal in dependence on the symbol to be encoded 102. Method 100 subsequently comprises applying a phase modulation of a BPSK (N-level) modulation format to the optical carrier signal in dependence on the symbol 104. N is the positive integer 2.

Figure 13:
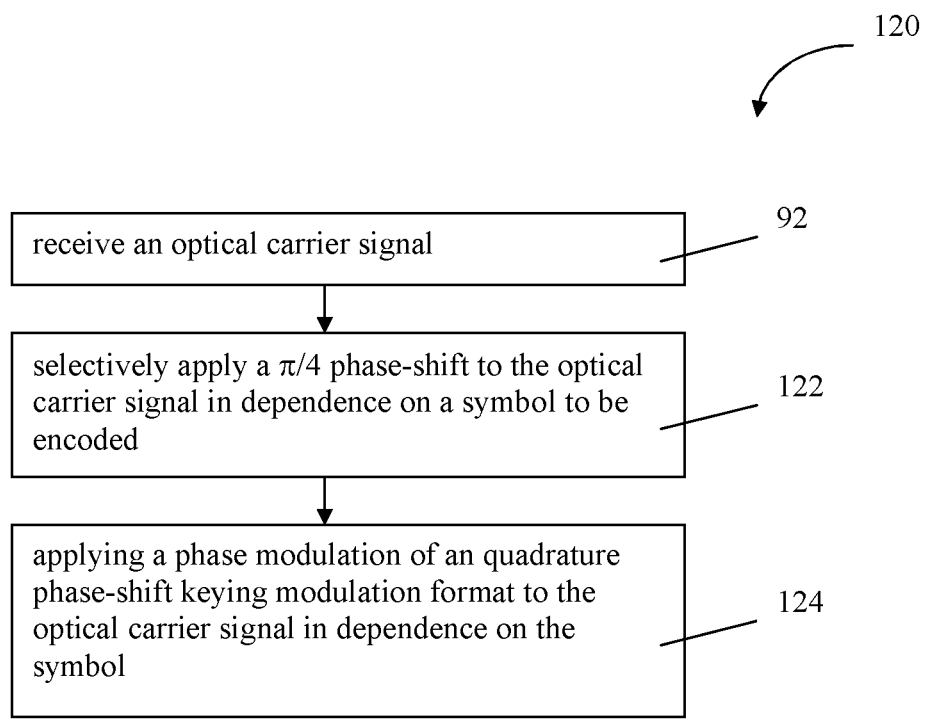
FIG. 13 shows the steps of a method according to a tenth embodiment of the invention of encoding a symbol of a 2N-level phase shift keying modulation format onto an optical carrier signal.

FIG. 13 shows the steps of a method 120 according to a tenth embodiment of the invention of encoding a symbol of an 8PSK (2N-level) modulation format onto an optical carrier signal. The method 120 comprises receiving an optical carrier signal 92 and selectively applying a π/4 phase shift to the optical carrier signal in dependence on the symbol to be encoded 122. The method 120 subsequently comprises applying a phase modulation of a QPSK (N-level) modulation format to the optical carrier signal in dependence on the symbol 124. N is the positive integer 4.

The invention claimed is:

1. A phase shift keying optical modulation apparatus comprising:
an optical phase shifting apparatus arranged to receive an optical carrier signal and arranged to selectively apply a preselected optical phase shift to the optical carrier signal in dependence on a symbol of a 2N-level phase shift keying modulation format to be encoded onto the optical carrier signal; and
an optical modulator arranged to receive the optical carrier signal from the optical phase shifting apparatus and arranged to apply a phase modulation to the optical carrier signal in dependence on the symbol, the phase modulation being a phase-modulation of an N-level phase shift keying modulation format, to thereby encode the symbol onto the optical carrier signal,
wherein the optical phase shifting apparatus comprises:
a first optical path arranged to apply a first phase shift to the optical carrier signal;
a second optical path comprising an optical phase shifter arranged to apply the reselected optical phase shift, relative to the first optical phase shift, to the optical carrier signal; and
an optical switch arranged to receive the optical carrier signal and arranged to selectively route the optical carrier signal into one of the first optical path and the second optical path; and
wherein the phase shift keying optical modulation apparatus further comprises a controller arranged to generate and transmit to the optical switch a control signal arranged to cause the optical switch to route the optical carrier signal in dependence on the symbol, and arranged to generate and transmit to the optical modulator a drive signal arranged to cause the optical modulator to apply the phase-modulation to the optical signal, to thereby encode the symbol onto the optical carrier signal.

2. The phase shift keying optical modulation apparatus as claimed in claim 1, wherein the N-level phase shift keying modulation format is one of binary phase shift keying and quadrature phase shift keying and the 2N-level phase shift keying modulation format is one of quadrature phase shift keying and eight-level phase shift keying respectively.

3. The phase shift keying optical modulation apparatus as claimed in claim 1, wherein the phase shift keying optical modulation apparatus additionally comprises an encoding apparatus arranged to receive communications traffic bits to be transmitted and arranged to map each bit into a respective symbol of a 2N-level phase shift keying modulation format, and the optical switch has a switching time which is comparable to a baud rate of the communications traffic bits.

4. The phase shift keying optical modulation apparatus as claimed in claim 1, wherein the optical modulator is a multilevel phase shift keying phase modulator.

5. The phase shift keying optical modulation apparatus as claimed in claim 1, wherein the optical modulator is an optical IQ modulator and the optical phase shifting apparatus is arranged to selectively apply a π/4 phase shift.

6. The phase shift keying optical modulation apparatus as claimed in claim 5, wherein the controller is arranged to generate first and second drive signals in dependence on the symbol, the drive signals being arranged to cause the optical IQ modulator to apply the phase-modulation to the optical signal, and wherein each of the control signal and the first and second drive signals has a respective signal level, and there is a unique correspondence between each symbol of the 2N-level phase shift keying modulation format and the signal levels of the respective control signal, first drive signal and second drive signal.

7. The phase shift keying optical modulation apparatus as claimed in claim 1, wherein the optical modulator is a binary phase shift keying modulator and the optical phase shifting apparatus is arranged to selectively apply a π/2 phase shift.

8. An optical transmitter comprising:
    an optical source arranged to generate an optical carrier signal; and
    the phase shift keying optical modulation apparatus as claimed in claim 1.

9. An optical communications network transponder comprising:
    an optical source arranged to generate an optical carrier signal; and
    the phase shift keying optical modulation apparatus as claimed in claim 1.

10. A method of encoding a symbol of a 2N-level phase shift keying modulation format onto an optical carrier signal, the method comprising:
    a. receiving an optical carrier signal;
    b. selectively applying a pre-selected phase shift to the optical carrier signal in dependence on the symbol; and
    c. applying a phase modulation of an N-level phase shift keying modulation format to the optical carrier signal in dependence on the symbol,
    wherein selectively applying a pre-selected phase shift comprises:
        optically switching the optical carrier signal to selectively route the optical carrier signal into one of a first optical path and a second optical path;
        wherein the second optical path comprises an optical phase shifter applying the preselected optical phase shift, relative to the first optical phase shift, to the optical carrier signal; and
        generating and transmitting to the optical switch a control signal arranged to cause the optical switch to route the optical carrier signal in dependence on the symbol, and generating and transmitting to the optical modulator a drive signal to cause the optical modulator to apply the phase-modulation to the optical signal, to thereby encode the symbol onto the optical carrier signal.

11. The method as claimed in claim 10, wherein the N-level phase shift keying modulation format is binary phase shift keying and the 2N-level phase shift keying modulation format is quadrature phase shift keying, and the pre-selected phase shift is π/2.

12. The method as claimed in claim 10, wherein the N-level phase shift keying modulation format is quadrature phase shift keying and the 2N-level phase shift keying modulation format is eight-level phase shift keying, and the pre-selected phase shift is π/4.

13. A non-transitory data carrier having computer readable instructions embodied therein, the said computer readable instructions being for providing access to resources available on a processor and the computer readable instructions comprising instructions to cause the processor to perform a method of encoding a symbol of a 2N-level phase shift keying modulation format onto an optical carrier signal, the method comprising:
    a. receiving an optical carrier signal;
    b. selectively applying a pre-selected phase shift to the optical carrier signal in dependence on the symbol; and
    c. applying a phase modulation of an N-level phase shift keying modulation format to the optical carrier signal in dependence on the symbol,
    wherein selectively applying a pre-selected phase shift comprises:
        optically switching the optical carrier signal to selectively route the optical carrier signal into one of a first optical path and a second optical path;
        wherein the second optical path comprises an optical phase shifter applying the preselected optical phase shift, relative to the first optical phase shift, to the optical carrier signal; and
        generating and transmitting to the optical switch a control signal arranged to cause the optical switch to route the optical carrier signal in dependence on the symbol, and generating and transmitting to the optical modulator a drive signal to cause the optical modulator to apply the phase-modulation to the optical signal, to thereby encode the symbol onto the optical carrier signal.

* * * * *